(12) United States Patent
Matsuyama et al.

(10) Patent No.: US 11,408,346 B2
(45) Date of Patent: Aug. 9, 2022

(54) FUEL INJECTOR

(71) Applicant: KAWASAKI JUKOGYO KABUSHIKI KAISHA, Kobe (JP)

(72) Inventors: Ryusuke Matsuyama, Takatsuki (JP); Hitoshi Fujiwara, Tokyo (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 165 days.

(21) Appl. No.: 16/642,213

(22) PCT Filed: Aug. 28, 2017

(86) PCT No.: PCT/JP2017/030692
§ 371 (c)(1),
(2) Date: Feb. 26, 2020

(87) PCT Pub. No.: WO2019/043751
PCT Pub. Date: Mar. 7, 2019

(65) Prior Publication Data
US 2021/0381436 A1 Dec. 9, 2021

(51) Int. Cl.
*F02C 7/22* (2006.01)
*F23R 3/28* (2006.01)

(52) U.S. Cl.
CPC .............. *F02C 7/222* (2013.01); *F23R 3/286* (2013.01); *F05D 2220/32* (2013.01); *F05D 2240/36* (2013.01)

(58) Field of Classification Search
CPC .................................. F23R 3/286; F23R 3/283
See application file for complete search history.

(56) References Cited

U.S. PATENT DOCUMENTS 7,942,003 B2 * 5/2011 Baudoin ................. F23R 3/343
60/748
8,365,531 B2 * 2/2013 Pidcock ................ F23D 11/107
60/737
(Continued)

FOREIGN PATENT DOCUMENTS

JP 2008-196831 A 8/2008
JP 2013-253738 A 12/2013
WO 2013/183618 A1 12/2013

OTHER PUBLICATIONS

International Search Report for PCT/JP2017/030692 dated Sep. 26, 2017 (PCT/ISA/210).

*Primary Examiner* — Todd E Manahan
*Assistant Examiner* — Thuyhang N Nguyen
(74) *Attorney, Agent, or Firm* — Sughrue Mion, PLLC (57) ABSTRACT

A fuel injector includes: a pilot fuel injection portion including a pilot fuel supply block and a pilot shroud; a main fuel injection portion arranged so as to surround the pilot fuel injection portion from an outer side in a radial direction; and an intermediate air passage arranged between the pilot fuel injection portion and the main fuel injection portion. The pilot shroud includes: a throat located at a downstream side of the pilot fuel supply block; and a flame holding portion surrounding flame located at the downstream side of the throat. An air injection slit is formed at the flame holding portion, the air injection slit being configured to inject compressed air of the intermediate air passage in a direction along an inner peripheral surface of the flame holding portion such that the compressed air covers the inner peripheral surface over an entire periphery.

9 Claims, 3 Drawing Sheets

(56) References Cited

U.S. PATENT DOCUMENTS

| | | | |
|---|---|---|---|
| 10,132,499 B2 * | 11/2018 | Matsuyama | F23R 3/28 |
| 2007/0269757 A1 * | 11/2007 | Commaret | F23R 3/286 |
| | | | 431/265 |
| 2008/0302105 A1 | 12/2008 | Oda et al. | |
| 2009/0173076 A1 * | 7/2009 | Toon | F23D 14/74 |
| | | | 60/746 |
| 2010/0162713 A1 | 7/2010 | Li et al. | |
| 2013/0327849 A1 | 12/2013 | Matsuyama et al. | |
| 2015/0082797 A1 | 3/2015 | Matsuyama et al. | |
| 2015/0159874 A1 * | 6/2015 | Toon | F23D 11/107 |
| | | | 60/737 |

* cited by examiner

FUEL INJECTOR

CROSS REFERENCE TO RELATED APPLICATIONS

This application is a National Stage of International Application No. PCT/JP2017/030692 filed Aug. 28, 2017.

TECHNICAL FIELD

The present invention relates to a fuel injector that is supplied with compressed air from an upstream side.

BACKGROUND ART

A concentric hybrid fuel injector is known, in which a diffusion combustion type pilot fuel injection portion is arranged at a radial center of a gas turbine combustor, and a lean combustion type main fuel injection portion is arranged at a radially outer side of the pilot fuel injection portion (see PTL 1, for example). The fuel injector realizes a NOx reduction by changing a combustion state of the pilot fuel injection portion and a combustion state of the main fuel injection portion based on an output condition.

CITATION LIST

Patent Literature

PTL 1: Japanese Laid-Open Patent Application Publication No. 2013-253738

SUMMARY OF INVENTION

Technical Problem

In the configuration of PTL 1, an air injection unit configured to inject air in an axial direction is arranged between the pilot fuel injection portion and the main fuel injection portion, and the pilot fuel injection portion and the air injection unit are defined by a pilot shroud. Fuel injected from the pilot fuel injection portion is combusted at an inner diameter side of the pilot shroud to generate flame. In recent years, an inlet temperature of the gas turbine combustor tends to become high in accordance with a request for increases in temperature and pressure. Therefore, the temperature of the air for cooling parts of the combustor also becomes high, and heat of the flame is directly input to the pilot shroud. This increases heat load with respect to an outlet end portion (tip end portion) of the pilot shroud and an inner peripheral surface located close to the outlet end portion.

An object of the present invention is to suitably cool a downstream portion of an inner peripheral surface of a pilot shroud.

Solution to Problem

A fuel injector according to one aspect of the present invention is a fuel injector configured to inject fuel to compressed air of a combustion chamber to combust the fuel and includes: a pilot fuel injection portion including a pilot fuel supply block and a tubular pilot shroud, the pilot shroud being arranged at a radially outer side of the pilot fuel supply block and projecting to a downstream side beyond the pilot fuel supply block; a main fuel injection portion including a main passage in which a pre-mixed gas is generated, the main fuel injection portion being arranged so as to surround the pilot fuel injection portion from an outer side in a radial direction; and an intermediate air passage arranged between the pilot fuel injection portion and the main fuel injection portion. The pilot shroud includes: a throat located at the downstream side of the pilot fuel supply block; and a flame holding portion surrounding flame located at the downstream side of the throat. An air injection slit is formed at the flame holding portion, the air injection slit being configured to inject the compressed air of the intermediate air passage in a direction along an inner peripheral surface of the flame holding portion such that the compressed air covers the inner peripheral surface over an entire periphery.

According to the above configuration, the air injected from the air injection slit flows in the direction along the inner peripheral surface of the flame holding portion to cover the inner peripheral surface over the entire periphery. Therefore, the inner peripheral surface of the flame holding portion of the pilot shroud can be isolated from the flame, and nonuniformity of distribution density of the air on the inner peripheral surface of the flame holding portion is suppressed. On this account, a downstream portion of the inner peripheral surface of the pilot shroud can be suitably cooled.

The air injection slit may inject the compressed air as a film-shaped linear stream flowing along the inner peripheral surface of the flame holding portion.

According to the above configuration, the air injected from the air injection slit is the film-shaped linear stream flowing along the inner peripheral surface of the flame holding portion. Therefore, as compared to when the air is made to flow through a swirler to be injected as a swirling stream, mixing of the flame on the inner peripheral surface of the flame holding portion is suppressed. In addition, before the air becomes high in temperature, the air is quickly discharged to the downstream side. In addition, since vertical vortexes are hardly generated as compared to a stripe-shaped stream, mixing of minute flame on the inner peripheral surface of the flame holding portion is also suppressed. Therefore, when cooling the downstream portion of the inner peripheral surface of the pilot shroud, both cooling efficiency and cooling uniformity can be improved at the same time.

The flame holding portion may have a shape that increases in diameter toward the downstream side, and the air injection slit may be open toward the downstream side and the radially outer side.

According to the above configuration, the air can suitably protect the inner peripheral surface of an enlarged diameter portion (flame holding portion) at which the flame tries to spread outward in the radial direction.

An injection direction of the air injection slit may be parallel to or intersect with the inner peripheral surface.

According to the above configuration, the flame can be suitably prevented from getting into between the air injected from the air injection slit and the inner peripheral surface of the flame holding portion.

The main fuel injection portion may include an inner main shroud including a radially inner side surface defining the main passage, and an air injection opening that injects the compressed air to a combustion chamber may be formed between a downstream end portion of the pilot shroud and the inner main shroud in the radial direction.

According to the above configuration, an inner peripheral surface of the downstream end portion of the pilot shroud is cooled by the air injected from the air injection slit, and an outer peripheral surface of the downstream end portion of the pilot shroud is cooled by the air flowing through the air injection opening. To be specific, the downstream end portion of the pilot shroud can be cooled from both sides in the radial direction, and heat load can be effectively reduced.

The air injection opening may be a second air injection slit, and a third air injection slit that injects the compressed air to the combustion chamber may be formed between the second air injection slit and the inner main shroud in the radial direction.

According to the above configuration, an air curtain formed by the compressed air injected from the second air injection slit can surround the flame held by the pilot shroud, and a radially outer side wall of the second air injection slit can be cooled by the air flowing through the third air injection slit.

The compressed air may be supplied from the intermediate air passage to the second air injection slit and the third air injection slit.

According to the above configuration, since the compressed air is supplied to three air injection slits from one air passage, the fuel injector can be prevented from increasing in size.

The air introducing port that introduces the compressed air of the intermediate air passage to the air injection slit may be provided at the pilot shroud, and the air introducing port may be arranged at the radially outer side of an injection port of the air injection slit.

According to the above configuration, the air located away from the flame toward the radially outer side is introduced from the intermediate air passage to the air injection slit. Therefore, the temperature increase of the air before the injection can be suppressed, and the cooling performance can be improved.

A concave portion that is depressed toward a radially inner side at the throat may be formed on an outer peripheral surface of the pilot shroud, the outer peripheral surface facing the intermediate air passage, and an air introducing port may be arranged at the radially outer side of the concave portion.

According to the above configuration, the air staying at the concave portion of the outer peripheral surface of the throat of the pilot shroud serves as a heat-insulating air layer. Therefore, the temperature increase of the air introduced from the intermediate air passage through the air introducing port to the air injection slit can be suitably prevented before the injection.

An inner peripheral surface located at the downstream side of the air injection slit as a part of the inner peripheral surface of the flame holding portion may be located at the radially outer side of an inner peripheral surface located at the upstream side of the air injection slit as another part of the inner peripheral surface of the flame holding portion so as to form a step shape.

According to the above configuration, the air injected from the air injection slit can be easily made to flow along the inner peripheral surface of the flame holding portion.

Advantageous Effects of Invention

According to the present invention, the downstream portion of the inner peripheral surface of the pilot shroud can be suitably cooled.

DESCRIPTION OF EMBODIMENTS

Hereinafter, an embodiment will be described with reference to the drawings.

Figure 1:
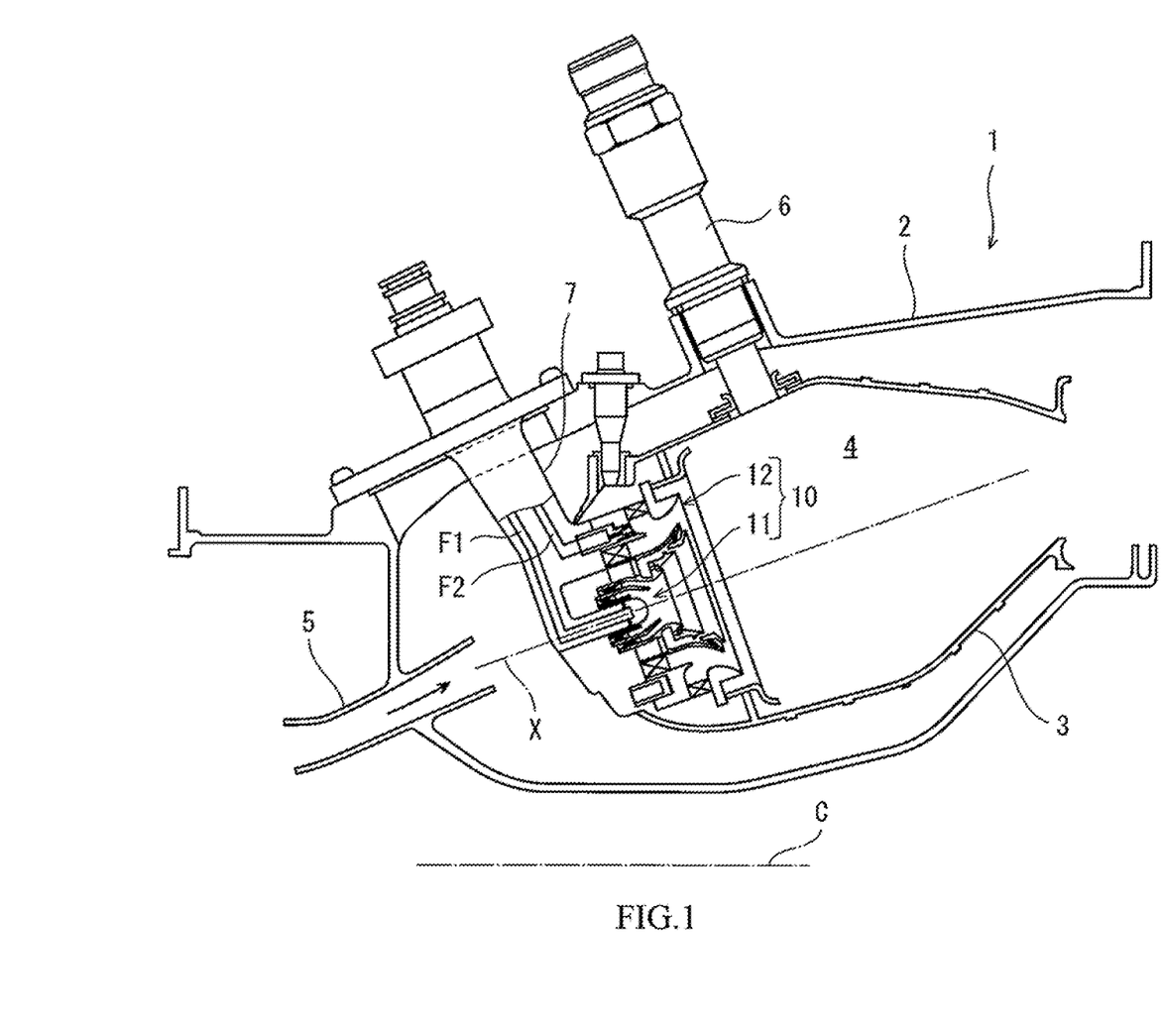
FIG. 1 is a sectional view of a combustor including a fuel injector according to an embodiment.

FIG. 1 is a sectional view of a combustor 1 including a fuel injector 10 according to the embodiment. As shown in FIG. 1, the fuel injector 10 constitutes part of the combustor 1 of a gas turbine engine. The combustor 1 mixes compressed air, supplied from a compressor (not shown), and fuel to generate a fuel-air mixture, and then combusts the fuel-air mixture. Thus, the combustor 1 generates high-temperature and high-pressure combustion gas. The generated combustion gas is supplied to a turbine (not shown) to drive the turbine. The combustor 1 is, for example, an annular-type combustor formed in an annular shape surrounding a shaft center C of the gas turbine. However, the combustor 1 may be a different-type combustor (such as a can-type combustor). In FIG. 1, a paper surface upper side corresponds to a radially outer side of the gas turbine, and a paper surface lower side corresponds to a radially inner side of the gas turbine. A paper surface left side corresponds to an upstream side (front side) of the combustion gas, and a paper surface right side corresponds to a downstream side (rear side) of the combustion gas.

The combustor 1 includes a combustor housing 2, a combustion liner 3, and a plurality of fuel injectors 10. The combustor housing 2 forms an annular internal space. The combustion liner 3 is arranged in the combustor housing 2 and forms an annular combustion chamber 4. The plurality of fuel injectors 10 are provided at an upstream side portion of the combustion liner 3 at regular intervals in a circumferential direction of the combustion liner 3. A diffuser 5 is provided at an upstream side portion of the combustor housing 2. The diffuser 5 takes compressed air, generated by a compressor, into the combustor housing 2. The compressed air taken into the combustor housing 2 is supplied to the fuel injectors 10 and also supplied to the combustion chamber 4 in the combustion liner 3 through a plurality of air holes (not shown) formed at the combustion liner 3.

An ignition plug 6 is provided at the combustion liner 3. When starting the gas turbine, the ignition plug 6 generates a spark for ignition in the combustion chamber 4. The fuel injector 10 is supported by a stem 7 fixed to the combustor housing 2. The fuel injector 10 includes a pilot fuel injection portion 11 and a main fuel injection portion 12. The pilot fuel injection portion 11 generates diffusion combustion, and the main fuel injection portion 12 generates lean combustion. Liquid fuel is supplied to the pilot fuel injection portion 11 and the main fuel injection portion 12 through fuel passages F1 and F2 formed in the stem 7.

Figure 2:
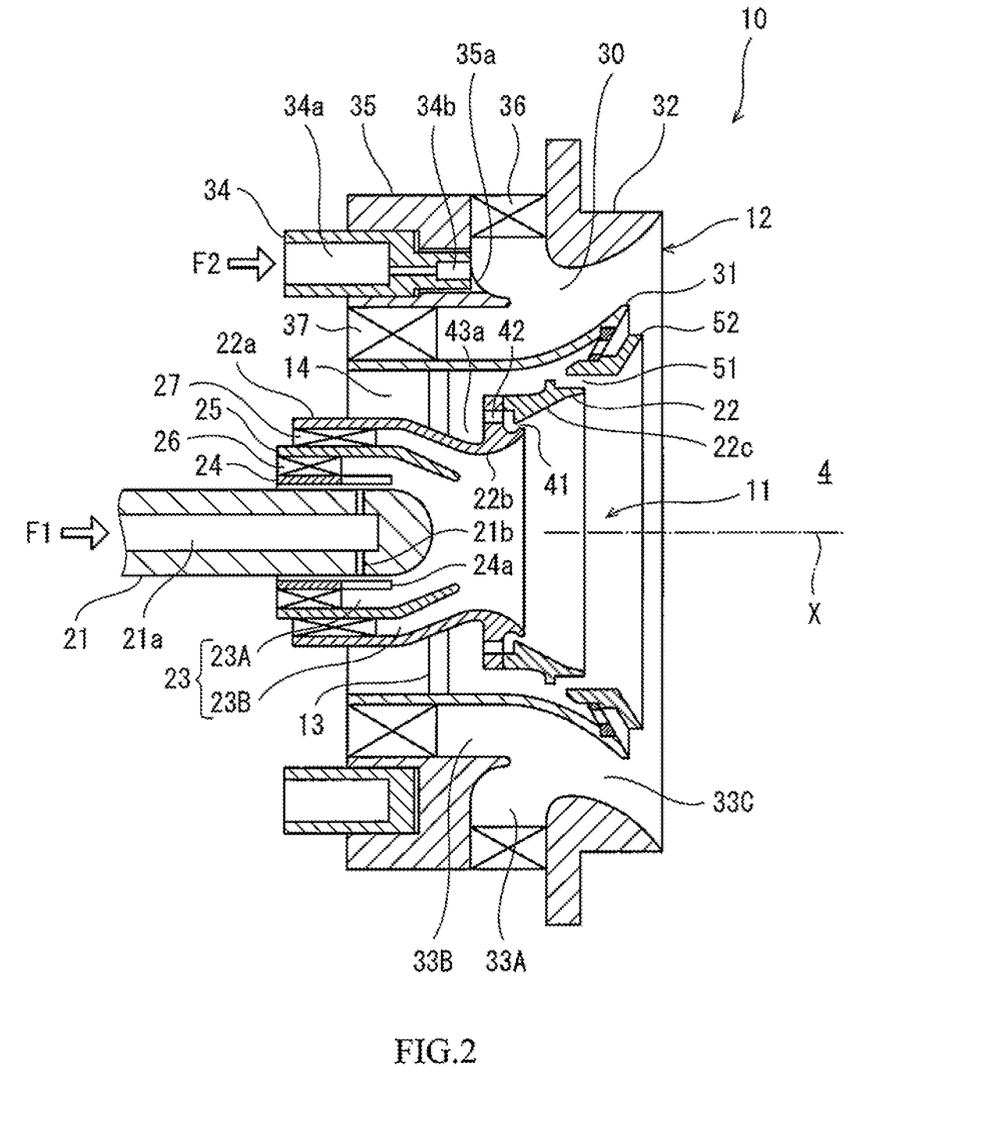
FIG. 2 is a sectional view of the fuel injector shown in FIG. 1.

FIG. 2 is a sectional view of the fuel injector 10 shown in FIG. 1. As shown in FIG. 2, in the fuel injector 10, the pilot fuel injection portion 11 is arranged on an axis X of the fuel injector 10, and the main fuel injection portion 12 is arranged so as to surround the pilot fuel injection portion 11 from an outer side in a radial direction. The pilot fuel injection portion 11 and the main fuel injection portion 12 are arranged so as to be spaced apart from each other in the radial direction. An intermediate air passage 14 is formed between the pilot fuel injection portion 11 and the main fuel injection portion 12. The compressed air taken in the combustor housing 2 from the diffuser 5 (see FIG. 1) flows into the intermediate air passage 14. In FIG. 2, the pilot fuel injection portion 11 and the main fuel injection portion 12 are coupled to each other by a coupling portion 13. However, the present embodiment is not limited to this, and the coupling portion 13 may be omitted.

The pilot fuel injection portion 11 includes a pilot fuel supply block 21, a tubular pilot shroud 22, and an annular pilot air passage 23. The pilot shroud 22 is arranged at the radially outer side of the pilot fuel supply block 21 so as to be spaced apart from the pilot fuel supply block 21 and projects toward the downstream side in a direction along the axis X beyond the pilot fuel supply block 21. The pilot air passage 23 is provided between the pilot fuel supply block 21 and the pilot shroud 22, and a swirling stream flows through the pilot air passage 23 toward the downstream side of the pilot fuel supply block 21.

The pilot fuel supply block 21 is arranged on the axis X and has a columnar shape extending along the axis X. A pilot fuel passage 21a and a plurality of pilot fuel injection holes 21b are formed at the pilot fuel supply block 21. The pilot fuel passage 21a communicates with the fuel passage F1. The plurality of pilot fuel injection holes 21b extend from the pilot fuel passage 21a outward in the radial direction, and the fuel in the pilot fuel passage 21a is injected through the plurality of pilot fuel injection holes 21b. It should be noted that the configuration of the pilot fuel supply block 21 is not limited to the above-described configuration. For example, the pilot fuel supply block 21 may be configured such that: the fuel injected in an annular shape is sandwiched between layers of the compressed air to be supplied in a film shape; or the fuel is pressurized and then sprayed.

The pilot shroud 22 includes a base end portion 22a, a throat 22b, and a flame holding portion 22c (downstream portion). The base end portion 22a is arranged at the radially outer side of the pilot fuel supply block 21. The throat 22b is located adjacent to the base end portion 22a at the downstream side in the direction along the axis X and decreases in diameter at the downstream side of the pilot fuel supply block 21 toward the downstream side. The flame holding portion 22c is located adjacent to the throat 22b at the downstream side and increases in diameter toward the downstream side in the direction along the axis X.

An inlet of the pilot air passage 23 is open toward a space between the combustor housing 2 and the fuel injector 10. The pilot air passage 23 includes an inner pilot air passage 23A and an outer pilot air passage 23B located at the radially outer side of the inner pilot air passage 23A. In the inner pilot air passage 23A, the fuel flows to the downstream side in the direction along the axis X. In the outer pilot air passage 23B, the compressed air with which the fuel is not mixed flows to the downstream side along the axis X. It should be noted that the specific configuration of the pilot air passage 23 is not limited to the configuration shown in FIG. 2. Further, the pilot air passage 23 may be omitted.

The inner pilot air passage 23A is a compressed air passage defined by an inner tubular body 24 and an outer tubular body 25. The pilot fuel supply block 21 is inserted into the inner tubular body 24. The outer tubular body 25 is arranged at the radially outer side of the inner tubular body 24 so as to be spaced apart from the inner tubular body 24. An inner pilot swirler 26 is provided at an inlet of the inner pilot air passage 23A. The inner pilot swirler 26 makes the compressed air swirl around the axis X.

The outer pilot air passage 23B is a compressed air passage defined by the outer tubular body 25 and the pilot shroud 22. The pilot shroud 22 is arranged at the radially outer side of the outer tubular body 25 so as to be spaced apart from the outer tubular body 25. An outer pilot swirler 27 is provided at an inlet of the outer pilot air passage 23B. The outer pilot swirler 27 makes the compressed air swirl around the axis X.

Fuel flow-through holes 24a are formed at the inner tubular body 24 so as to be located at positions corresponding to the pilot fuel injection holes 21b of the pilot fuel supply block 21. The fuel supplied to the pilot fuel passage 21a of the pilot fuel supply block 21 flows through the pilot fuel injection holes 21b and the fuel flow-through holes 24a to be injected to the inner pilot air passage 23A. The fuel injected to the inner pilot air passage 23A flows through a space surrounded by the throat 22b and the flame holding portion 22c together with the compressed air flowing through the inner pilot air passage 23A and the outer pilot air passage 23B to be supplied to the combustion chamber 4 and subjected to diffusion combustion. The flame generated by the combustion of the fuel injected from the pilot fuel supply block 21 is surrounded by the flame holding portion 22c of the pilot shroud 22.

The main fuel injection portion 12 includes a tubular inner main shroud 31, a tubular outer main shroud 32, an annular main air passage 30, and a main fuel supply block 34. The outer main shroud 32 is arranged at the radially outer side of the inner main shroud 31 so as to be spaced apart from the inner main shroud 31. The main air passage 30 is formed between the inner main shroud 31 and the outer main shroud 32. The main fuel supply block 34 injects the fuel to the main air passage 30. In the main air passage 30, a pre-mixed gas is generated and supplied to the combustion chamber 4 as a swirling stream.

The inner main shroud 31 includes a radially inner side surface defining the main air passage 30, and the outer main shroud 32 includes a radially outer side surface defining the main air passage 30. The inner main shroud 31 is coupled to the pilot shroud 22 by the coupling portion 13. The inner main shroud 31 and the outer main shroud 32 project toward the downstream side in the direction along the axis X beyond the pilot shroud 22. It should be noted that each of downstream ends of the main shrouds 31 and 32 may be located at substantially the same position as a downstream end of the pilot shroud 22 in the direction along the axis X.

The main air passage 30 includes an outer main air passage 33A, an inner main air passage 33B, and a joining main air passage 33C. The inner main air passage 33B is provided at the radially inner side of the outer main air passage 33A. The outer main air passage 33A and the inner main air passage 33B join at the joining main air passage 33C, and the joining main air passage 33C communicates with the combustion chamber 4. A partition main shroud 35 is provided at a position opposed to both the inner main shroud 31 and the outer main shroud 32. A downstream end of the partition main shroud 35 is arranged at the upstream side of each of the downstream end of the inner main shroud 31 and the downstream end of the outer main shroud 32.

The outer main air passage 33A is formed between the outer main shroud 32 and the partition main shroud 35. The inner main air passage 33B is formed between the inner main shroud 31 and the partition main shroud 35. The joining main air passage 33C is formed between the inner main shroud 31 and the outer main shroud 32 at the downstream side of the partition main shroud 35.

The partition main shroud 35 is arranged at the radially outer side of the inner main shroud 31 and the upstream side of the outer main shroud 32 in the direction along the axis X. An inlet of the outer main air passage 33A is open outward in the radial direction, and the compressed air flows in the outer main air passage 33A from a space between the combustor housing 2 and the fuel injector 10. An outer main swirler 36 is provided at the inlet of the outer main air passage 33A. The outer main swirler 36 makes the compressed air swirl around the axis X. An inlet of the inner main air passage 33B is open toward the upstream side in the direction along the axis X, and the compressed air flows in the inner main air passage 33B from the space between the combustor housing 2 and the fuel injector 10. An inner main swirler 37 is provided at the inlet of the inner main air passage 33B. The inner main swirler 37 makes the compressed air swirl around the axis X. The joining main air passage 33C is a passage where the compressed air taken by the outer main air passage 33A and the compressed air taken by the inner main air passage 33B join. The joining main air passage 33C extends toward the combustion chamber 4.

It should be noted that the air passages and fuel supply structure of the main fuel injection portion 12 are not limited to the configurations shown in FIG. 2. For example, the inlet of the inner main air passage may be open toward the radially inner side. The inlet of the outer main air passage may be open toward the upstream side in the direction along the axis. The partition main shroud may be omitted.

A main fuel passage 34a and a main fuel injection hole 34b are formed at the main fuel supply block 34. The main fuel passage 34a communicates with the fuel passage F2. The main fuel injection hole 34b injects the fuel of the main fuel passage 34a to the main air passage 30. A fuel flow-through hole 35a is formed at the partition main shroud 35 so as to be located at a position corresponding to the main fuel injection hole 34b of the main fuel supply block 34. The fuel supplied to the main fuel passage 34a flows through the main fuel injection hole 34b and the fuel flow-through hole 35a to be injected to the outer main air passage 33A. Then, the fuel is adequately premixed with the compressed air in the joining main air passage 33C and supplied to the combustion chamber 4 to be subjected to lean combustion.

Figure 3:
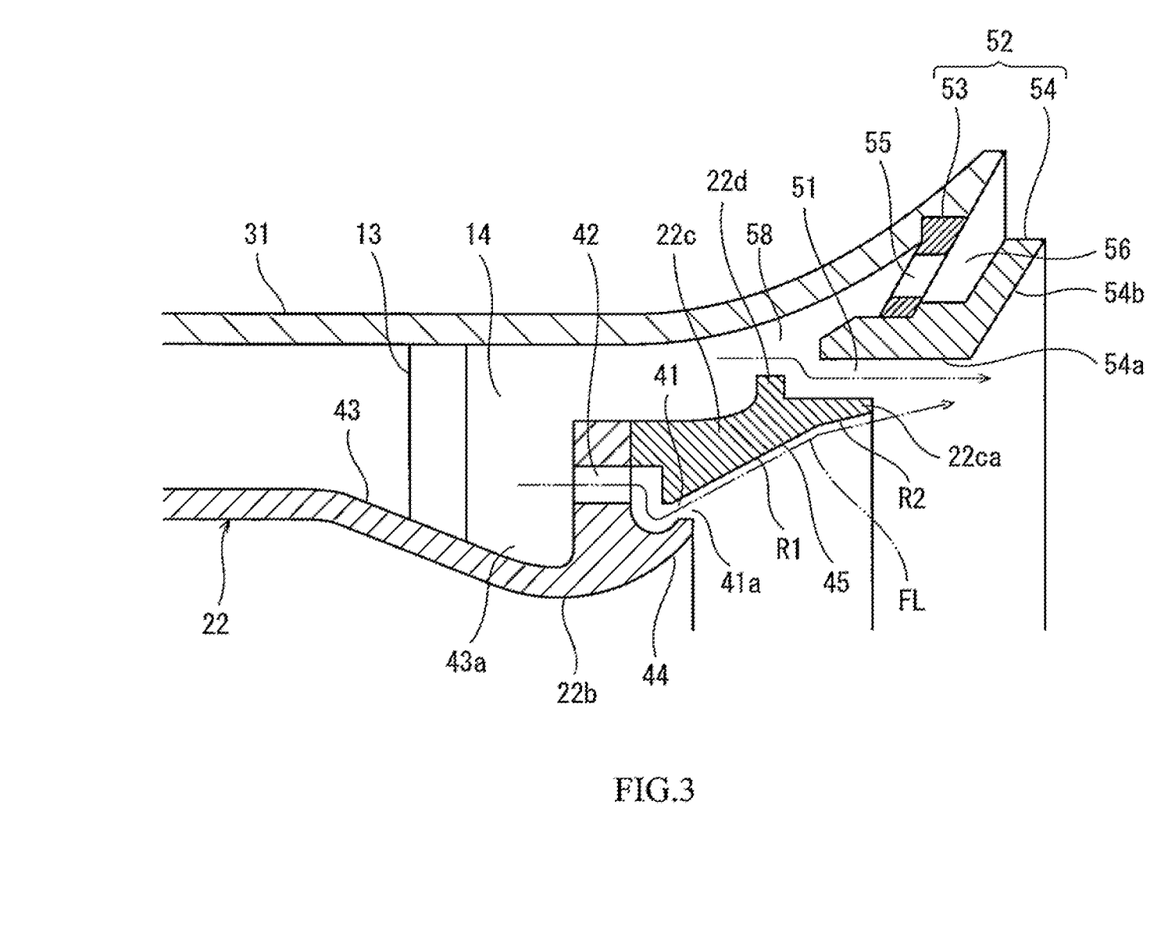
FIG. 3 is an enlarged view of the fuel injector shown in FIG. 2.

FIG. 3 is an enlarged view of the fuel injector 10 shown in FIG. 2. As shown in FIGS. 2 and 3, an air injection slit 41 is formed at the pilot shroud 22 so as to be located at the downstream side of the throat 22b in the direction along the axis X and the upstream side of a downstream end portion 22ca of the flame holding portion 22c in the direction along the axis X. The air injection slit 41 injects the compressed air of the intermediate air passage 14 to the downstream side along an inner peripheral surface of the flame holding portion 22c.

The air injection slit 41 may be formed at the flame holding portion 22c over the entire periphery around the axis X or may be formed by a plurality of slits arranged so as to occupy 85 to 100% of the entire periphery around the axis X. A swirler configured to guide the compressed air around the axis X is not interposed in a passage extending from the intermediate air passage 14 to the air injection slit 41. The air injection slit 41 injects the compressed air as a film-shaped linear stream FL to the downstream side in the direction along the axis X. It should be noted that the linear stream denotes the stream of the air flowing in the fuel injector 10 without passing through a swirler and may be slightly inclined.

An air introducing port 42 is provided at the pilot shroud 22. The air introducing port 42 introduces the compressed air of the intermediate air passage 14 to the air injection slit 41. A passage sectional area of the air introducing port 42 which area is perpendicular to a passage axis of the air introducing port 42 is larger than a passage sectional area of the air injection slit 41 which area is perpendicular to a passage axis of the air injection slit 41.

In a section viewed from the radial direction, a passage extending from the air introducing port 42 to the air injection slit 41 has a bent shape. To be specific, the compressed air flowing from the air introducing port 42 to the air injection slit 41 collides with a wall surface, and thereby, the distribution of the compressed air is made uniform. In the example of the present embodiment, the passage extending from the air introducing port 42 to the air injection slit 41 has two bent portions, and these bent portions are bent in a crank shape.

As one example, the air introducing port 42 is open in the direction along the axis X. The air introducing port 42 is arranged at the radially outer side of an injection port 41a of the air injection slit 41. A concave portion 43a is formed at an outer peripheral surface 43 of the pilot shroud 22. The outer peripheral surface 43 faces the intermediate air passage 14, and the concave portion 43a is depressed toward the radially inner side at the throat 22b. The air introducing port 42 is provided at a position that is located at the downstream side of the concave portion 43a and the radially outer side of a bottom surface of the concave portion 43a so as to be spaced apart from the bottom surface of the concave portion 43a. In the present embodiment, the air introducing port 42 is arranged such that a virtual line formed by extending the passage axis of the air introducing port 42 toward the upstream side does not interfere with the pilot shroud 22. It should be noted that the configuration of the passage extending from the air introducing port 42 to the air injection slit 41 is not limited to the configuration shown in FIG. 2. For example, a passage extending linearly from the air introducing port 42 to the air injection slit 41 may be adopted.

The air injection slit 41 is open toward the downstream side and the radially outer side. An inner peripheral surface 45 located at the downstream side of the air injection slit 41 as a part of an inner peripheral surface of the flame holding portion 22c is located at the radially outer side of an inner peripheral surface 44 located at the upstream side of the air injection slit 41 as another part of the inner peripheral surface of the flame holding portion 22c so as to form a step shape. For example, a virtual extension plane extending toward the upstream side from the inner peripheral surface 45 located at the downstream side of the air injection slit 41 as a part of the inner peripheral surface of the flame holding portion 22c is located at the radially outer side of the inner peripheral surface 44 located at the upstream side of the air injection slit 41. Further, the virtual extension plane extending toward the upstream side from the inner peripheral surface 45 may not intersect with the inner peripheral surface 44. An injection direction of the air injection slit 41 is parallel to or intersects with the inner peripheral surface 45 of the flame holding portion 22c at the downstream side of the air injection slit 41. If the injection direction of the air injection slit 41 and the inner peripheral surface 45 of the flame holding portion 22c intersect with each other, an intersection angle between the injection direction of the air injection slit 41 and the inner peripheral surface 45 of the flame holding portion 22c is set to an angle within a range of 0° to 10°.

The inner peripheral surface 45 located at the downstream side of the air injection slit 41 as a part of the flame holding portion 22c includes a first region R1 and a second region R2. The first region R1 is located adjacent to the air injection slit 41 and increases in diameter toward the downstream side. The second region R2 is provided at the downstream side of the first region R1 and includes an inner peripheral surface of the downstream end portion 22*ca*. An inclination angle of the second region R2 with respect to the axis X is smaller than an inclination angle of the first region R1 with respect to the axis X. A length of the second region R2 in the direction along the axis X is shorter than a length of the first region R1 in the direction along the axis X.

As one example, the passage axis of the air injection slit 41 extends in parallel with the first region R1 of the inner peripheral surface 45 and intersects with the second region R2 of the inner peripheral surface 45 at an angle within a range of 0° to 10°. The compressed air injected from the air injection slit 41 as the film-shaped linear stream FL flows along the first region R1 of the inner peripheral surface 45. Next, the compressed air contacts the second region R2, and this slightly changes the direction of the compressed air. Then, the compressed air flows toward the combustion chamber 4.

An air injection opening 51 (second air injection slit) is provided between the downstream end portion 22*ca* of the pilot shroud 22 and the inner main shroud 31. The air injection opening 51 injects the compressed air of the intermediate air passage 14 to the combustion chamber 4. The air injection opening 51 has a slit shape. The air injection opening 51 may be formed over the entire periphery around the axis X or may be formed by a plurality of slits arranged so as to occupy 85 to 100% of the entire periphery around the axis X. The compressed air injected from the air injection opening 51 may flow along the axis X. A swirler configured to guide the compressed air around the axis X is not interposed in a passage extending from the intermediate air passage 14 to the air injection opening 51. The air injection opening 51 may inject the compressed air as the film-shaped linear stream to the downstream side in the direction along the axis X.

A projection 22*d* is located at the upstream side of the air injection opening 51 in the direction along the axis X and the downstream side of the air injection slit 41 in the direction along the axis X and projects from the outer peripheral surface of the pilot shroud 22 outward in the radial direction toward the intermediate air passage 14. For example, the projection 22*d* has a shape that is annular around the axis X. With this, an annular air introducing port 58 is formed between a projecting end of the projection 22*d* and the inner peripheral surface of the inner main shroud 31. When viewed from the direction along the axis X, the projection 22*d* at least partially overlaps the air injection opening 51. To be specific, the air introducing port 58 is located at the radially outer side of the air injection opening 51. Therefore, in a section viewed from the radial direction, a passage extending from the air introducing port 58 to the air injection opening 51 has a bent shape. On this account, by changing a projecting amount of the projection 22*d*, the flow rate of the air flowing from the intermediate air passage 14 to the air injection opening 51 can be adjusted, and wake can be suppressed. It should be noted that the air introducing port 58 may be a hole formed on an annular wall that connects the inner peripheral surface of the inner main shroud 31 and the outer peripheral surface of the pilot shroud 22.

The air injection opening 51 is located at the downstream side of the air injection slit 41 and the air introducing port 42 in the direction along the axis X. The air injection opening 51 is located at the radially outer side of the air introducing port 42 for the air injection slit 41. Specifically, an annular projecting wall 52 is arranged at the radially outer side of the downstream end portion 22*ca* of the pilot shroud 22. The annular projecting wall 52 projects from the inner main shroud 31 inward in the radial direction and is interposed between the intermediate air passage 14 and the combustion chamber 4. The air injection opening 51 is a gap formed between the projecting wall 52 and the downstream end portion 22*ca* of the pilot shroud 22. The compressed air injected from the air injection opening 51 intersects with the compressed air injected from the air injection slit 41 at the downstream side of the pilot shroud 22.

As one example, the projecting wall 52 includes an annular dividing wall plate portion 53 and a flame holding plate portion 54. The dividing wall plate portion 53 projects from the inner main shroud 31 toward the radially inner side and the upstream side. The flame holding plate portion 54 is fixed to an inner diameter side end portion of the dividing wall plate portion 53. The flame holding plate portion 54 includes a tubular peripheral wall portion 54*a* and an inclined portion 54*b*. The peripheral wall portion 54*a* is fixed to an inner diameter end of the dividing wall plate portion 53 and extends in the direction along the axis X. The inclined portion 54*b* increases in diameter from a downstream end of the peripheral wall portion 54*a* toward the downstream side. The inclined portion 54*b* extends along the dividing wall plate portion 53 while being spaced apart from the dividing wall plate portion 53. To be specific, the inclined portion 54*b* covers the dividing wall plate portion 53 from the downstream side while being spaced apart from the dividing wall plate portion 53.

The air injection opening 51 is formed between the downstream end portion 22*ca* of the pilot shroud 22 and the flame holding plate portion 54. An air injection hole 55 that is open in the direction along the axis X is formed at a part of the dividing wall plate portion 53 which part is covered with the flame holding plate portion 54. The air injection hole 55 is constituted by a plurality of holes lined up in the circumferential direction but may be formed in a slit shape. Regarding the compressed air in the intermediate air passage 14, a part of the compressed air which part did not flow to the air injection slit 41 is injected from the air injection opening 51 to the combustion chamber 4 in the direction along the axis X, and a remaining part thereof flows through the air injection hole 55 into a third air injection slit 56 to be injected to the radially outer side of the combustion chamber 4. The third air injection slit 56 is formed between the dividing wall plate portion 53 and the flame holding plate portion 54. To be specific, the air flowing through the third air injection slit 56 cools the flame holding plate portion 54 that is a radially outer side wall of the air injection opening 51.

The passage sectional area of the air injection slit 41 which area is perpendicular to the passage axis of the air injection slit 41 is, for example, smaller than a passage sectional area of the air injection opening 51 which area is perpendicular to a passage axis of the air injection opening 51. When viewed from a direction perpendicular to the axis X, a passage thickness of the air injection slit 41 is, for example, smaller than a passage thickness of the air injection opening 51. The passage sectional area of the air injection slit 41 which area is perpendicular to the passage axis of the air injection slit 41 is, for example, smaller than a passage sectional area of the air injection hole 55 which area is perpendicular to a passage axis of the air injection hole 55. When viewed from the direction perpendicular to the axis X, the passage thickness of the air injection slit 41 is, for example, smaller than a passage thickness of the air injection hole 55.

According to the above-described configuration, the compressed air injected from the air injection slit 41 is the film-shaped linear stream flowing along the inner peripheral surface 44b of the flame holding portion 22c. Therefore, as compared to when the compressed air is made to flow through a swirler to be injected as a swirling stream, mixing of the flame in the air is suppressed. In addition, before the air becomes high in temperature, the air is quickly discharged to the downstream side. As described above, the compressed air injected from the air injection slit 41 is the film-shaped linear stream flowing along the inner peripheral surface 45 of the flame holding portion 22c. Therefore, as compared to when the compressed air is inject as a stripe-shaped stream from a large number of circular holes, non-uniformity of distribution density of the air on the inner peripheral surface 45 of the flame holding portion 22c is suppressed. In addition, since vertical vortexes are hardly generated as compared to the stripe-shaped stream, mixing of minute flame on the inner peripheral surface 45 is also suppressed. Therefore, when cooling the downstream portion of the inner peripheral surface 44b of the pilot shroud 22, both cooling efficiency and cooling uniformity can be improved at the same time.

Especially, according to the configuration in which the swirling stream flows from the pilot air passage 23 to the downstream side, the flame spreads outward in the radial direction by the swirling stream at the downstream side of the throat 22b, and therefore, the flame tends to contact the flame holding portion 22c. Thus, the flame holding portion 22c is strongly influenced by the flame. In the present embodiment, since the cooling performance for the flame holding portion 22c that is strongly influenced by the flame as above improves, durability of the pilot shroud improves.

Further, since the air injection slit 41 is open toward the downstream side and the radially outer side, the inner peripheral surface 45 of the flame holding portion 22c having a shape that increases in diameter toward the downstream side can be suitably covered with the air of the film-shaped linear stream. Furthermore, since the injection direction of the air injection slit 41 extends so as to be parallel to or intersect with the inner peripheral surface 45 of the flame holding portion 22c located at the downstream side of the air injection slit 41, the flame can be suitably prevented from getting into between the air injected from the air injection slit 41 and the inner peripheral surface 45 of the flame holding portion 22c.

Further, since the air injection opening 51 that injects the compressed air toward the combustion chamber 4 is formed between the downstream end portion 22ca of the pilot shroud 22 and the inner main shroud 31, the inner peripheral surface of the downstream end portion 22ca of the pilot shroud 22 is cooled by the air injected from the air injection slit 41, and the outer peripheral surface of the downstream end portion 22ca of the pilot shroud 22 is cooled by the air flowing through the air injection opening 51. To be specific, the downstream end portion 22ca of the pilot shroud 22 can be cooled from both sides in the radial direction, and oxidation can be effectively prevented.

Spraying of the fuel from the pilot fuel injection portion 11 can be prevented from spreading toward the outer diameter side by an air curtain formed by the compressed air injected from the air injection opening 51, and the flame holding plate portion 54 can be cooled by the air flowing through the third air injection slit 56. Further, since the compressed air is supplied to three air injection slits 41, 51, and 56 from one intermediate air passage 14, the fuel injector 10 can be prevented from increasing in size.

Since the air introducing port 42 through which the compressed air of the intermediate air passage 14 is introduced to the air injection slit 41 is arranged at the radially outer side of the injection port 41a of the air injection slit 41, the compressed air located away from flame toward the radially outer side is introduced from the intermediate air passage 14 to the air injection slit 41. Therefore, the temperature increase of the air before the injection can be suppressed, and the cooling performance can be improved.

Since the air introducing port 42 for the air injection slit 41 is arranged at the radially outer side of the concave portion 43a of the outer peripheral surface 43 of the throat 22b of the pilot shroud 22, the air staying at the concave portion 43a serves as a heat-insulating air layer. Therefore, the temperature increase of the air introduced from the intermediate air passage 14 through the air introducing port 42 to the air injection slit 41 can be suitably prevented before the injection.

The section of the air injection slit 41 is smaller than each of the sections of the air injection opening 51 and the air injection hole 55 arranged at the downstream side of the air injection slit 41. Therefore, the film-shaped linear stream covering the inner peripheral surface 45 of the flame holding portion 22c can be stably formed by the compressed air injected from the air injection slit 41, and the decrease in the flow rate of the air flowing to the air injection opening 51 located at the downstream side of the air injection slit 41 can also be suppressed.

The present invention is not limited to the above-described embodiment. Modifications, additions, and eliminations may be made with respect to the configuration of the embodiment. For example, the injection direction of the air injection slit 41 extends in parallel with the first region R1 of the inner peripheral surface 44b of the flame holding portion 22c but may extend in such a direction as to slightly intersect with the first region R1 at an angle within a range of 0° to 10°. The flame holding portion 22c of the pilot shroud 22 does not have to increase in diameter toward the downstream side. In this case, the air injection slit 41 does not have to increase in diameter toward the downstream side and is only required to be open in such a direction as to inject the air of the film-shaped linear stream along the inner peripheral surface of the flame holding portion 22c. The downstream end portion of the pilot shroud 22 and the inner main shroud 31 may be airtightly coupled to each other without forming the air injection opening 51.

REFERENCE SIGNS LIST 4 combustion chamber
10 fuel injector
11 pilot fuel injection portion
12 main fuel injection portion
14 intermediate air passage
21 pilot fuel supply block
22 pilot shroud
22b throat
22c flame holding portion
22ca downstream end portion
31 inner main shroud
30 main air passage
41 air injection slit
42 air introducing port
43 outer peripheral surface
43a concave portion
44b inner peripheral surface
51 air injection opening (second air injection slit)
56 third air injection slit
FL film-shaped linear stream

The invention claimed is:

1. A fuel injector that is supplied with compressed air from an upstream side,
the fuel injector comprising:
a pilot fuel injection portion including a pilot fuel supply block and a tubular pilot shroud, the pilot shroud being arranged at a radially outer side of the pilot fuel supply block and projecting to a downstream side beyond the pilot fuel supply block;
a main fuel injection portion including a main air passage in which a pre-mixed gas is generated, the main fuel injection portion being arranged so as to surround the pilot fuel injection portion from an outer side in a radial direction; and
an intermediate air passage arranged between the pilot fuel injection portion and the main fuel injection portion, wherein:
the pilot shroud includes
a throat located at the downstream side of the pilot fuel supply block that decrease in diameter and
a flame holding portion surrounding flame located adjacent at the downstream side of the throat and having a shape that increases in diameter toward the downstream side; and
an air injection slit is formed at an upstream side of the flame holding portion adjacent the throat, the air injection slit being configured to inject the compressed air of the intermediate air passage in a direction along an inner peripheral surface of the flame holding portion such that the compressed air covers the inner peripheral surface over an entire periphery; and
the air injection slit is open obliquely toward the downstream side and the radially outer side.

2. The fuel injector according to claim 1, wherein the air injection slit injects the compressed air as a film-shaped linear stream flowing along the inner peripheral surface of the flame holding portion.

3. The fuel injector according to claim 1, wherein an injection direction of the air injection slit is parallel to or intersects with the inner peripheral surface.

4. The fuel injector according to claim 1, wherein:
the main fuel injection portion includes an inner main shroud including a radially inner side surface defining the main passage; and
an air injection opening that injects the compressed air to a combustion chamber is formed between a downstream end portion of the pilot shroud and the inner main shroud in the radial direction.

5. The fuel injector according to claim 4, wherein:
the air injection opening is a second air injection slit; and
a third air injection slit that injects the compressed air to the combustion chamber is formed between the second air injection slit and the inner main shroud in the radial direction.

6. The fuel injector according to claim 5, wherein the compressed air is supplied from the intermediate air passage to the second air injection slit and the third air injection slit.

7. The fuel injector according to claim 1, wherein:
a concave portion that is depressed toward a radially inner side at the throat is formed on an outer peripheral surface of the pilot shroud, the outer peripheral surface facing the intermediate air passage; and
an air introducing port is arranged at the downstream side of the concave portion and the radially outer side of a bottom surface of the concave portion.

8. The fuel injector according to claim 7, wherein:
the air introducing port that introduces the compressed air of the intermediate air passage to the air injection slit is provided at the pilot shroud; and
the air introducing port is arranged at the radially outer side of an injection port of the air injection slit.

9. The fuel injector according to claim 1, wherein a downstream portion of the inner peripheral surface located at the downstream side of the air injection slit as a part of the inner peripheral surface of the flame holding portion is located at the radially outer side of an upstream portion of the inner peripheral surface located at the upstream side of the air injection slit as another part of the inner peripheral surface of the flame holding portion so as to form a step shape.

* * * * *